(12) United States Patent
Bascle

(10) Patent No.: US 6,603,870 B1
(45) Date of Patent: Aug. 5, 2003

(54) METHOD AND APPARATUS FOR VISUAL SERVOING OF A LINEAR APPARATUS

(75) Inventor: Bénédicte Bascle, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/408,929

(22) Filed: Sep. 30, 1999

(51) Int. Cl.[7] .................................................. G06K 9/00
(52) U.S. Cl. ....................... 382/132; 382/153; 606/130; 700/57; 378/42
(58) Field of Search .......................... 606/130; 382/131, 382/132, 103, 154, 153; 600/461; 700/57; 378/42

(56) References Cited

U.S. PATENT DOCUMENTS

| | | | |
|---|---|---|---|
| 4,750,487 A | 6/1988 | Zanetti | 128/303 |
| 4,979,815 A * | 12/1990 | Tsikos | 356/2 |
| 5,617,335 A * | 4/1997 | Hashima et al. | 340/815.57 |
| 6,055,449 A * | 4/2000 | Navab | 378/98.12 |
| 6,249,713 B1 * | 6/2001 | Geiger et al. | 378/42 |

OTHER PUBLICATIONS

Copy of U.S. application Ser. No. 08/722,725, filed Sep. 30, 1996, *Apparatus and Method for Positioning a Biopsy Needle*.

* cited by examiner

*Primary Examiner*—Jon Chang
*Assistant Examiner*—Chong Kim
(74) *Attorney, Agent, or Firm*—Donald B. Paschburg; F. Chau & Associates, LLP

(57) ABSTRACT

A method and system for visual servoing of a linear apparatus rotatable in a plane about a fixed point implements cross-ratios and provides alignment of the linear apparatus to the target in an image, such as a fluoroscope image in 3 iterations. The imaging device through which the scene is observed can be of any suitable type and does not need to be calibrated.

14 Claims, 4 Drawing Sheets

3D WORLD

METHOD AND APPARATUS FOR VISUAL SERVOING OF A LINEAR APPARATUS

BACKGROUND OF THE INVENTION

1. Field of the Invention

The present invention relates to a method for visual servoing or aligning of apparatus and, more specifically, to a method of visual servoing of a linear apparatus rotatable in a plane about a fixed point.

2. Discussion of the Related Art

Linear apparatus comprise linear, lineal or line shaped apparatus and apparatus whereof at least a portion comprises a linear, line shaped part or which exhibits some lineal or line-shaped characteristic, such as, by way of example, a rod, a needle, a linear industrial tool such as a drill, a reamer, a probe, a drafting type of instrument, optical or microscope adjunct equipment, or generally any implement that has at least a portion that exhibits a line-like silhouette or outline or which has a characteristic that can be represented by a straight line, or two parallel straight lines, or generally by any implement that includes at least a portion that exhibits a cylindrical or near-cylindrical shape.

Generally, prior art servoing methods comprise making iterative corrections of the 3-dimensional (3D) position of all object based on visual feedback from the image. Whether such methods are performed manually or automatically, they have in common the fact that the needle is moved in 3D in a trial and error fashion until the projection of the needle is visually aligned to the projection of the target in the image. The number of iterations required for such an approach to converge is not known a priori and can be fairly high: 10–50 or more iterations may typically be needed.

Therefore, a need exists for an improved system and method is needed for servoing the linear apparatus.

SUMMARY OF THE INVENTION

Applications involving alignment include the automatic placement of needles for percutaneous procedures and biopsies, as indicated in FIG. 3. For example, needle placement can be achieved by visual servoing of the needle in several successive planes, until the needle is in the desired position and orientation to reach a particular anatomical site in a patient. The action is performed under X-ray fluoroscopy before insertion of the needle. A detailed description of the method is described in Appendix A. The principles of the present invention are applicable to such visual servoing.

Also of interest to the subject matter of the present invention are the following: copending U.S. patent application Ser. No. 08/935,269, entitled APPARATUS AND METHOD FOR DETECTION AND LOCALIZATION OF A BIOPSY NEEDLE OR SIMILAR SURGICAL TOOL IN A RADIOGRAPHIC IMAGE, with a filing date of Sep. 22, 1997, filed in the name of Navab; copending U.S. patent application Ser. No. 08/722,707 for N. Navab et al., entitled APPARATUS AND METHOD FOR AUTOMATICALLY POSITIONING A BIOPSY NEEDLE; copending U.S. patent application Ser. No. 08/722,708 for N. Navab et al., entitled APPARATUS AND METHOD FOR DETERMINING THE CORRECT INSERTION DEPTH FOR A BIOPSY NEEDLE; copending U.S. patent application Ser. No. 08/722,724 for N. Navab et al., entitled TRIGONOMETRIC DEPTH GAUGE FOR BIOPSY NEEDLE; copending U.S. patent application Ser. No. 08/935,270 for N. Navab et al., entitled METHOD FOR LOCALIZATION OF A BIOPSY NEEDLE OR SIMILAR SURGICAL TOOL IN A RADIOGRAPHIC IMAGE; copending U.S. patent application Ser. No. 08/107,787 for N. Navab et al., entitled METHOD AND APPARATUS FOR PRECISE NEEDLE PLACEMENT USING VISUAL SERVOING. The disclosure of the foregoing is herein incorporated by reference to the extent not incompatible with the present invention.

It is herein recognized that visual aiming may also include applications in surveillance or process supervision where the goal can be to keep an object in the center of, for example, a camera field of view or in a location for facilitating the fixing of attention on the object. Other applications include robot guidance in which robot motion is effected and controlled for obtaining alignment of a robot arm or manipulator arm portion with a target.

Linear apparatus of the type to which the method of the present invention applies is rotatable about a defined center point of rotation and may rotatably pivoted about such a point of rotation. Furthermore, such rotation takes place in a plane including within itself the point of rotation.

In practicing the method of the present invention, the linear apparatus is observed through an imaging device, which could be a camera utilizing a charge coupled imaging device (CCD) in combination with suitable optical components, an )X-ray fluoroscope or some other suitable kind of imaging device.

The imaging device produces an image of the linear apparatus and of its surrounding environment. The image is conveniently stored in a memory in digitally encoded format which also facilitates further processing of the image, and may be displayed in a convenient form such as on a screen as commonly used in conjunction with a fluoroscope or otherwise as may be convenient. In accordance with the invention, the linear device is visually aligned with a defined target point which is also defined in the image. Such a target point may be defined interactively by the user of the present method or it may be found automatically using image processing techniques.

An aspect of the present invention is that it performs visual alignment of the linear apparatus to a target T, that is, it ensures that the linear apparatus appears in an image to be aligned to target T or, in other words, that the projection of the linear apparatus in the image is aligned to the projection of the target in the image. While visual alignment or visual servoing in accordance with this aspect of the invention is not of itself a full 3D alignment of the linear apparatus to target T, nevertheless, for many applications, achieving visual alignment in this sense is sufficient and full 3D alignment may not be required. There are applications wherein the constellation or relative positions of a linear apparatus and target are constrained in ways which are advantageous for the application of visual servoing such that a single performance: of visual servoing provides, in effect, a complete 3D alignment. An example of this is provided by the embodiment wherein labels are affixed to bottles, as will be hereinafter described.

In order to achieve visual servoing, the position of the target in three-dimensional space ("3D position") need not be known. All that is needed is the position of the 2-dimensional projection of the 3-D target in the image ("2-D target").

In accordance with a further aspect of the invention, achieving visual alignment is utilized as an intermediate step to achieving full 3D alignment. An object of the present invention is accordingly to provide 3D alignment utilizing the method of visual servoing herein disclosed as an advantageous step in a method for achieving 3D alignment. The afore-cited U.S. patent application Ser. No. 08/722,725 discloses that visual servoing in several successive planes achieves complete 3D alignment, utilizing other methods to perform the visual servoing.

In accordance with an aspect of the present inventions, 3D alignment is achieved through application of visual servoing which utilizes fewer iteration; than was typical heretofore.

In accordance with an aspect of the present inventions, 3D alignment is achieved application of visual servoing which utilizes 3 iterations.

Performing visual servoing in accordance with the method of the present invention comprises positioning the linear apparatus so that it is visually aligned to the target point in the image. See FIG. 1. In accordance with the principles of the present invention, a method and an apparatus for visual servoing of a linear apparatus utilizes just 3 iterations and no calibration of the camera or imaging device is needed.

In accordance with an aspect of the invention a method and apparatus for visual servoing of a linear apparatus is based on the use of cross-ratios, which is a known invariant of projective geometry.

In accordance with an aspect of the invention, a method for visual servoing of a linear apparatus for aiming at a fixed target, the linear apparatus being rotatable in a defined plane about a fixed point, and wherein the linear apparatus and target are viewed by an imaging process in a two-dimensional (2D) image plane, comprises the steps of: beginning at an arbitrary first line direction in space of the linear apparatus, detecting and storing an image of the first line direction in the 2D image plane; detecting and storing an image of the fixed target in the 2D image plane; rotating the: linear apparatus through a first angle in the defined plane about the fixed point to a second line direction; detecting and storing an image of the second line direction in the 2D image plane; rotating the linear apparatus through a second angle in the defined plane; about the fixed point to a third line direction; detecting and storing an image of the third line direction in the 2D image plane; determining and storing the point of intersection in the 2D image plane of the images of the first, second, and third line directions; storing an image of a virtual straight line in the 2D image plane passing through the image of the fixed target in the 2D image plane and the point of intersection, the image of a virtual straight line being associated with a corresponding virtual line passing through the fixed point and the target; determining the cross-ratio of the 2D images of the first, second, third, and virtual line directions; calculating from the cross-ratio an aiming angle between the third and the virtual line directions in 3D space; and aligning the linear apparatus along the virtual line in accordance with the aiming angle so as to visually aim at the target.

In accordance with another aspect of the invention, a method for visual servoing of a linear apparatus includes a step of setting the cross-ratio of the 2D images of the first, second, third, and virtual line directions as equal to the cross-ratio of the 3D first, second, third, and virtual line directions. In accordance with another aspect of the invention, in a method for visual servoing of a linear apparatus, the step of determining the cross-ratio of that images of the first, second, third and virtual line directions comprises the steps of adding an arbitrary virtual line d that intersects the images of the first, second, third, and virtual line directions, hereinafter referred to as $l_1, l_2, l_3$ and $l_t$, determining the cross-ratio $c=(l_1,l_2,l_3,l_t)=(q_1,q_2, q_3,q_t)=$ $(q_1q_3*q_2q_t)+(q_1q_t*q_2q_3)$, where $q_1=l_1 \cap d, q_2=l_2 \cap d, q_3=l_3 \cap d$ and $q_t=l_t \cap d$ are the intersections of $l_1,l_2,l_3,l_t$ with d.

In accordance with another aspect of the invention, in a method for visual servoing of a linear apparatus, the first and second angles, and the aiming angle, hereinafter referred to as $\theta_1, \theta_2$ and $\theta_t$ respectively, and wherein c is the previously determined cross-ratio, and wherein the step of determining the cross-ratio of the 2D images of the first, second, third, and virtual line directions comprises the step of solving an equation for obtaining the aiming angle $\theta_t$:

$$(c-1)\sin\theta_2\cos\theta_t + \left(\frac{c\sin\theta_2}{\tan(\theta_1+\theta_2)} - \cos\theta_2\right)\sin\theta_t = 0$$

In accordance with another aspect of the invention, a method for visual servoing of a linear apparatus the steps are performed, at least in part, automatically under programmed computer control.

In accordance with a further aspect of the invention, apparatus for visual servoing of a linear apparatus for aiming at a fixed target, the linear apparatus being rotatable in a defined plane about a fixed point, and wherein the linear apparatus and target are viewed by an imaging process in a two-dimensional (2D) image plane, the apparatus for visual servoing includes computerized apparatus for reading, storing and processing data, and wherein the computerized apparatus detects and stores an image of the fixed target in the 2D image plane; detects and stores an image in the 2D image plane of a first arbitrary line direction in space of the linear apparatus; detects and stores an image in the 2D image plane of a second line direction in space of the linear apparatus wherein the second direction line in space is at a first angle in the defined plane relative to the first line direction; detects and stores an image in the 2D image plane of a third line direction in space of the linear apparatus wherein the third direction line .n space is at a second angle in the defined plane relative to the second line direction; determines and stores the point of intersection in the 2D image plane of the images of the first, second, and third line directions; stores an image of a virtual straight line in the 2D image plane passing through the image of the fixed target in the 2D image plane and the point of intersection, the image of a virtual straight line being associated with a corresponding virtual line passing through the fixed point and the target; determines the cross-ratio of the images of the first, second, third, and virtual line directions; and obtains from the cross-ratio an aiming angle between the third and the virtual line directions for alignment of the linear apparatus along the virtual line in accordance with the aiming angle.

In accordance with still a further aspect of the invention, a method and system or apparatus is disclosed for visual servoing of a linear apparatus rotatable in a plane about a fixed point. The linear apparatus may be, for example, a biopsy needle. The method is based on an application of cross-ratios and provides alignment of the linear apparatus to the target in an image, such as a fluoroscope image in 3 iterations. The imaging device through which the scene is observed can be of any suitable type and does not need to be calibrated.

BRIEF DESCRIPTION OF THE DRAWINGS

The invention will be more fully understood from the detailed description of preferred embodiments which follows, in conjunction with the Drawing, in which.

DETAILED DESCRIPTION OF PREFERRED EMBODIMENTS

Figure 1:
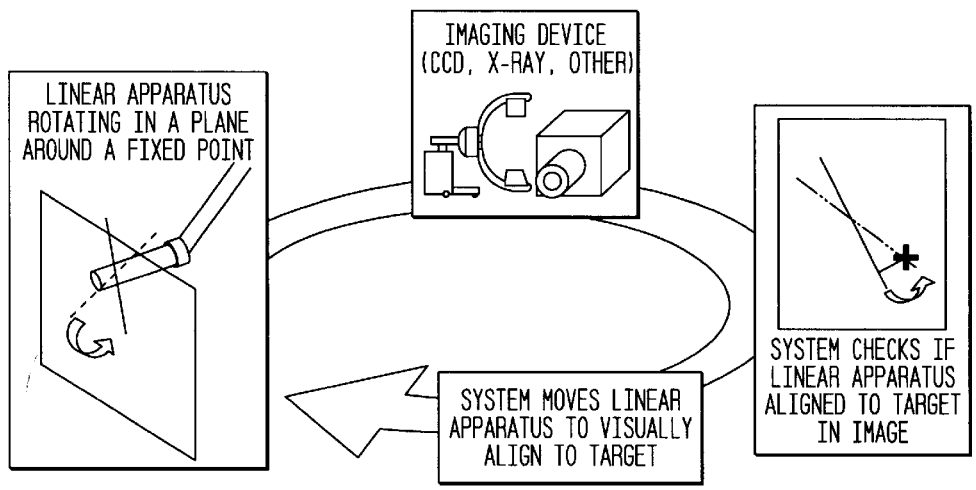
FIG. 1 shows in diagrammatic form the general principles of visual servoing.
Figure 2A:
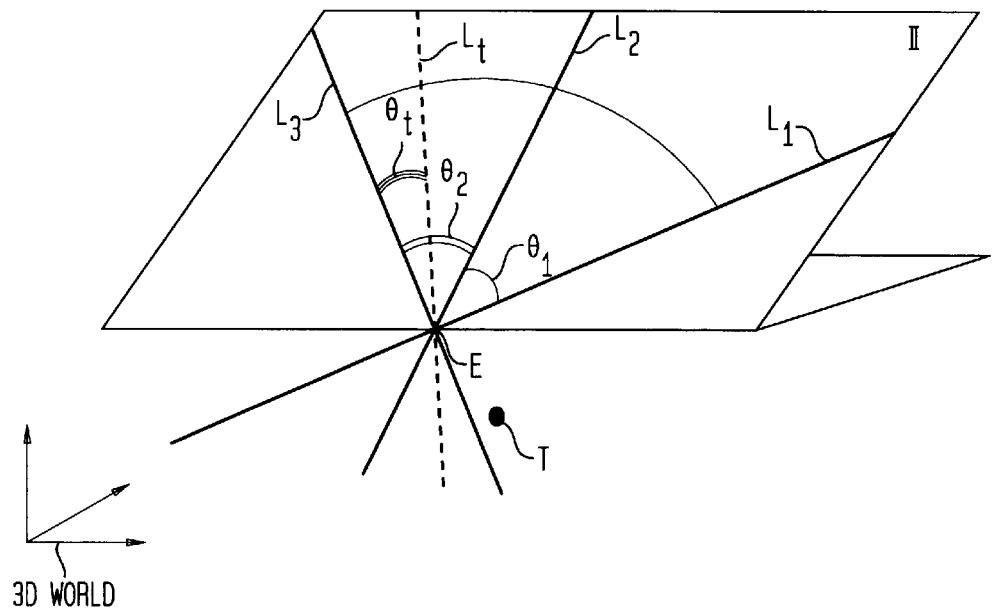
FIGS. 2a and 2b shows in diagrammatic form principles utilized in the present invention.
Figure 2B:
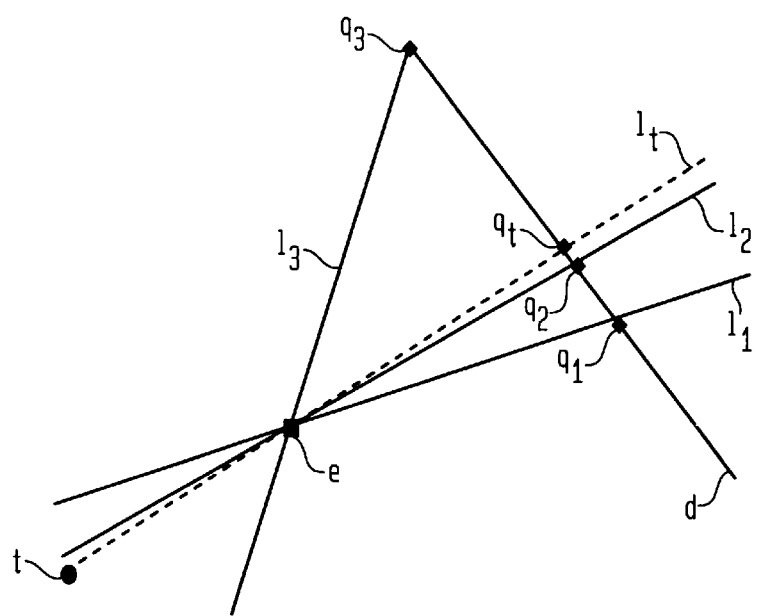

Referring now more particularly to FIGS. 2a and 2b, in accordance with the principles of the present invention, a method and system is herein disclosed for visual servoing of a linear apparatus rotatable in a plane Π about a fixed point E, utilizing the principle of cross-ratios. The cross-ratio is measured in the image, as defined by the projections of 3 successive positions of the linear apparatus ($l_1, l_2$ and $l_3$) and by the virtual 2D line $l_t = (et)$ that would align the projection of the linear apparatus to the target in the image.

From the cross-ratio, the system estimates the rotation $$\theta_t = \overline{(L_3, L_t)}$$

of the needle in three dimensional space necessary to achieve the visual alignment.

Referring to FIG. 2, Π is a plane in which the linear apparatus or object is rotatable, and E is fixed point around which or about which the rotation is done. The initial orientation line $L_1$ of the linear apparatus in plane Π is arbitrary and may be thought of as a vector direction in 3-dimensional space. T is a desired target for aiming thereat the linear apparatus to be servoed.

The configuration is observed through an imaging device (not shown), at a fixed position, resulting in a 2-dimensional image I. Upon the taking of an image, the 3D line $L_1$ of the linear apparatus projects into image I as a (2-dimensional line) $l_1$. Line $l_1$ is detected using known image processing techniques and its position in the image I is stored in a memory.

The linear apparatus is then rotated in plane n about fixed point E by an arbitrary angle $\theta_1$ which brings it to a position $L_2$. Another image is now taken by which the 3D line $L_2$ projects into image I as a (2-dimensional line) $l_2$. This position of 12 is detected and its position stored in memory.

The linear apparatus is then rotated by an arbitrary angle $\theta_2$. This puts it into position $L_3$. Another image is now taken by which the 3D line $L_3$ projects into image I as a (2-dimensional line) $l_3$. The position of $l_3$ is detected and its position stored in memory. Throughout the foregoing steps, target T remains stationary and projects into image I as a fixed (2-dimensional) point t. The position of t is given interactively by the user or determined by image processing.

The intersection point of $l_1, l_2$ and $l_3$ denoted in FIG. 2b as e, is determined by the known method of least squares.

The line $l_t = (et)$ is then constructed. It is noted that $l_t$ is the 2D projection of the 3D position $L_t$ of the linear apparatus that achieves visual servoing and that it is desired to estimate.

$l_1, l_2, l_3$ and $l_t$ form a pencil of 2D lines. The cross-ratio $c = (l_1, l_2, l_3, l_t)$ of these lines is calculated. This is done using an arbitrary line d that intersects all four lines. If $q_1 = l_1 \cap d$, $q_2 = l_2 \cap d, q_3 = l_3 \cap d$ and $q_t = l_t \cap d$ are the intersections of $l_1, l_2, l_3, l_t$ with d, then $C = (l_1, l_2, l_3, l_t) = (q_1, q_2, q_3, q_t) = (q_1 q_3 * q_2 q_t) + (q_1 q_t * q_2 q_3)$. It is noted that the value of c is invariant with respect to the choice of the line d.

One of the properties of cross-ratios is that the cross-ratio of a pencil of 3D lines is equal to the cross-ratio of the pencil of 2D lines formed by the perspective projections of the 3D lines in an image. Therefore the cross-ratio $(L_1, L_2, L_3, L_t)$ of the four 3D lines $L_1, L_2, L_3$ and $L_t$ is equal to c, i.e. $(L_1, L_2, L_3, L_t) = (l_1, l_2, l_3, l_t) = c$.

From $(L_1, L_2, L_3, L_t)$, the angle $\theta_t$ necessary to rotate the linear apparatus from position $L_3$ to $L_t$ is estimated. The formula for $\theta_t$ comes from the relationship between the cross-ratio of four lines and the angle between these lines. This gives:

$$(L_1, L_2, L_3, L_t) = (\sin(\theta_1 + \theta_2) * \sin(\theta_2 + \theta_t)) / (\sin(\theta_1 + \theta_2 + \theta_t) * \sin \theta_2).$$

Using the fact that $(L_1, L_2, L_3, L_t) = c$, the equation can be rewritten as follows:

$$(c-1)\sin\theta_2 \cos\theta_t + \left(\frac{c\sin\theta_2}{\tan(\theta_1 + \theta_2)} - \cos\theta_2\right)\sin\theta_t = 0.$$

This equation in $\theta_t$ is solved using the change of variable $$g = \tan\frac{\theta_t}{2}.$$

Note that there are in general 2 solutions for $\theta_t$ by this equation. However, these solutions are equal modulo $Pi(\pi)$, so that they define the same line $L_t$ without ambiguity.

With $\theta_t$ known, the linear apparatus is rotated by angle $\theta_t$ from position $L_3$ to $L_t$ so as to visually bring it into alignment with a line to the target, which is the result sought. This achieves visual servoing.

Figure 3:
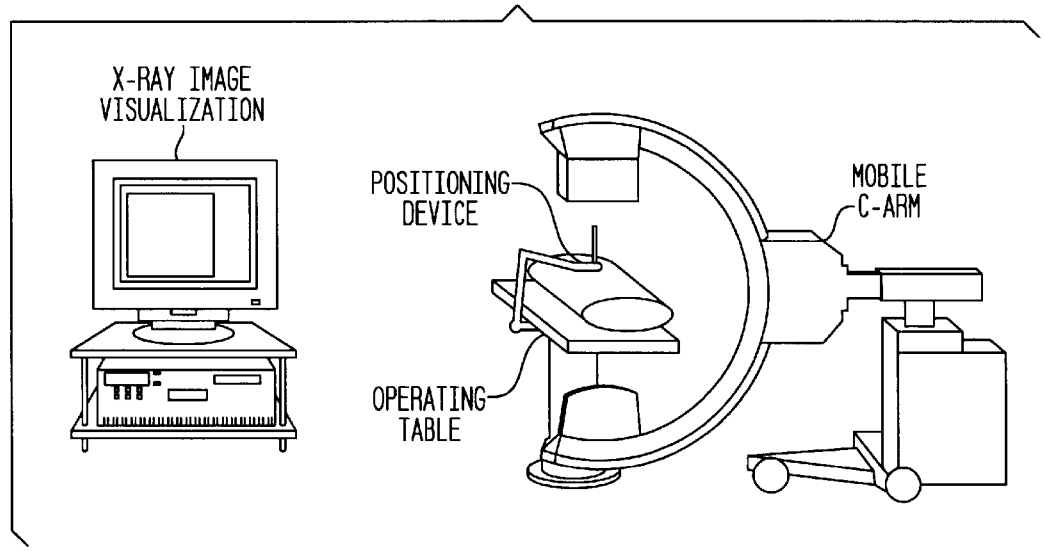
FIG. 3 shows an application in accordance with the principles of the present invention.

While the invention has been herein described in terms of its general applicability, the invention finds application in various different fields. One application, by way of example, is the automatic placement of needles for percutaneous procedures and biopsies, as shown in FIG. 3. This process gives a needle the right position and orientation in order to reach a particular anatomical site of a patient. It is typically performed under X-ray fluoroscopy before inserting the needle. In the aforementioned U.S. patent application Ser. No. 08/722,725, and in the aforelisted pending patent applications it is shown that needle placement can be achieved by visual servoing of the needle in several successive planes, until the desired position of the needle is reached. This visual servoing can be performed utilizing the method of the present invention.

Figure 4:
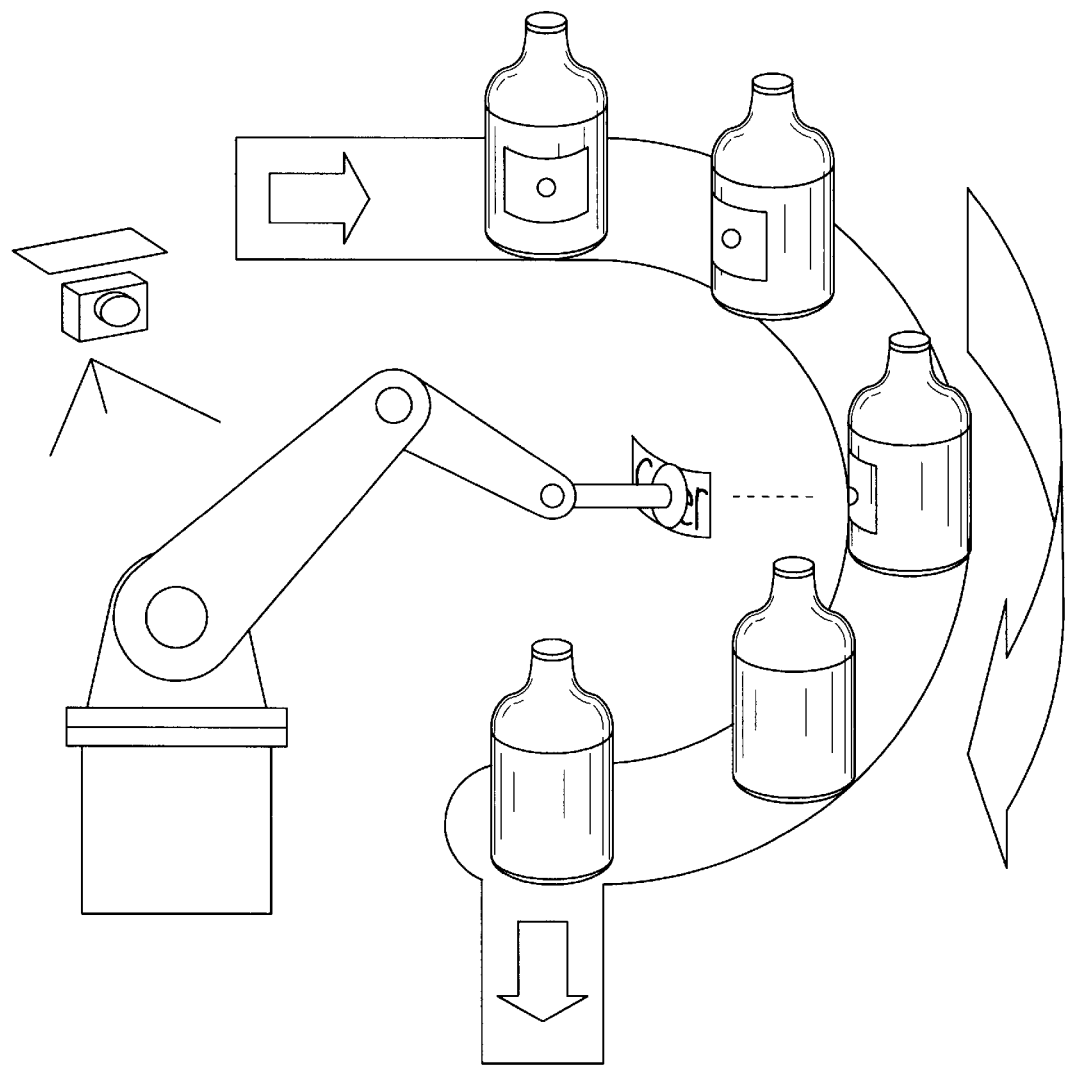
FIG. 4 shows another application in accordance with the principles of the present invention.

Another application, by way of another example, is the visual servoing of industrial tools as illustrated in FIG. 4. A robot arm 10 attaches labels 12 to containers 14 which are on a conveyor 16. The scene is viewed by a camera arrangement coupled to a computer 18 for processing and visual servoing of the robot arm activity in accordance with the present invention.

The invention has been described by way of illustrative preferred embodiments but it will be understood by one of skill in the art to which it pertains that various changes and modifications may be made to the invention without departing from the spirit of the For example, various imaging devices may be utilized and linear apparatus may be any of a variety of shaped objects, cylindrical or otherwise, having a suitable characteristic such as an axis, even in silhouette form, admitting of an aim or alignment being recognizable.

Further, it is to be understood that needle placement can be achieved by visual servoing of the needle in several successive planes, until the needle is in the desired position and orientation to reach a particular anatomical site in a patient. The action is performed under X-ray fluoroscopy before insertion of the needle. A detailed description of the method is described in Appendix A. The principles of the present invention are applicable to such visual servoing.

These and similar changes and modifications are intended to be within the scope of the claims following which define the invention.

Appendix A

An apparatus for positioning or aligning a biopsy needle for proper the body of a patient at a selected point on a surface of the body, so as to enter in a straight line passing through a designated target region within the body, comprises: a base including a circular measuring portion having a center point; a planar semicircular measuring portion mounted onto the base portion such that the center of the diameter of the semicircular measuring, portion is concentric with the center point so that the semicircular measuring portion is rotatable about the center point, the semicircle portion being further rotatable about a straight line through the diameter; and a straight pointing device having one point pivotably affixed to the center point and being constrained for movement within a plane defined by the planar semicircular portion.

Any or either of the circle portion and the planar semicircular portion is formed of a portion of a non-circular shaped bed wherein the circular and semicircular portions are not discernible as such.

Any of the circle portion and the planar semicircular portion is formed as an equivalent graduated scale in angle measure on a non-circular shaped portion.

The first and second planar measuring portions are graduated in angle measure.

The first and second planar measuring portions include a read-out device for reading out angles between the base, the first and the second planar measuring portions, and the pointing device.

The read-out device is an electronic digital device.

The apparatus includes a locking device for holding the angles.

The base is adapted for being placed on the body of a patient.

The pointing device comprises a guide for the biopsy needle.

Apparatus for positioning or aligning a biopsy needle for proper insertion into the body of a patient at a selected point on a surface of the body, so as to enter in a straight line passing through a designated target region within the body, comprises: a base including a planar full sector measuring portion having a center point; a planar half sector measuring portion mounted onto the base portion such that the midpoint of the chord of the half sector measuring portion is concentric with the center point so that the half sector measuring portion is rotatable about the center, the half sector portion being further rotatable about a straight through the diameter; and a straight guiding device having one point pivotably affixed to the center point and being constrained for movement within a plane defined by the planar half sector measuring portion.

Apparatus for positioning or aligning a biopsy needle for proper insertion into the body of a patient from a selected point on a surface of the body, so as to enter in a straight line passing through a designated target region within the body, in conjunction with an imaging system utilizing radiation from a first source position for deriving a first radiographic image on a first image plane of a portion of the body including a first image of the selected point and a first image of the target region, the first source position, the first image of the selected point, and the first image of the target region defining a first viewing plane $\pi$, the imaging system utilizing radiation from a second source position for deriving a second radiographic image on a second image plane of the portion of the body, including a second image of the selected point and a second image of the target region, the second source position, the second image of the selected point, and the second image of the target region define a second viewing plane $\pi^1$, comprises: first measuring circle apparatus for establishing a first auxiliary plane at a first plane angle $\Theta_1$ with respect to a selected set of coordinates and for constraining a pointer for moving rotatably about the selected point and within the first auxiliary plane to a first angle of inclination $\phi_1$ relative to the set of coordinates such that a projection or extension of an image of the pointer on the first image plane passes through the first image of the target region; second measuring circle apparatus for establishing a second auxiliary plane at a second plane angle $\Theta_2$ with respect to the selected set of coordinates, the second plane angle being different from the first plane angle such that the first and second auxiliary planes form an intersection line and for constraining a pointer for moving rotatably about the selected point and within the second auxiliary plane to a second angle of inclination $\phi_2$ relative to the set of coordinates such that a projection or extension of an image of the pointer on the first image plane passes through the first image of the tangent region, whereby the first viewing plane $\pi$ is uniquely defined by the angles $\Theta,\Theta_2$, $\phi_1$ and $\phi_2$ relative to the set of coordinates; apparatus for setting the pointer for moving rotatably about the selected point and within the first viewing plane $\pi$, now uniquely defined, to a third angle of inclination $\phi_3$ relative to the set of coordinates such that a projection or extension of an image of the pointer on the second image plane passes through further image of the target region, whereby the pointer points directly through the selected point toward the target region.

A method for positioning or aligning a biopsy needle for proper insertion into the body of a patient from a selected point on a surface of the body, so as to enter in a straight line passing through a designated target region within the body comprises the steps of: utilizing radiation from a first source position for deriving a first radiographic image on a first image plane of a portion of the body including a first image of the selected point and a first image of the target region, the first source position, the first image of the selected point, and the first image of the target region defining a first viewing plane $\pi$; establishing a first auxiliary plane at a first plane angle $\Theta_1$ with respect to a selected set of coordinates; moving a pointer rotatably about the selected point and within the first auxiliary plane to a first angle of inclination $\phi_1$ relative to the set of coordinates such that a projection or extension of an image of the pointer on the first image plane passes through the first image of the target region; establishing a second auxiliary plane at a second plane angle $\Theta_2$ with respect to the selected set of coordinates, the second plane angle being different from the$^1$ first plane angle such that the first and second auxiliary planes form an intersection line; moving the pointer rotatably about the selected point and within the second auxiliary plane to a second angle of inclination $\phi_2$ relative to the set of coordinates such that a projection or extension of an image of the pointer on the first image plane passes through the first image of the tangent region, whereby the first viewing plane I is uniquely defined by the angles $\Theta_1$, $\Theta_2$, $\phi_1$ and $\phi_2$ relative to the set of coordinates; utilizing radiation from a second source position for deriving a second radiographic image on a second image plane of the portion of the body, including a second image of the selected point angle second image of the target region, the second source position, the second image of the selected point, and the second image of the target region define a second viewing plane $\pi^1$; moving the pointer rotatably about the selected point and within the first viewing plane $\pi$, now uniquely defined, to a third angle of inclination $\phi_3$ relative to the set of coordinates such that a projection or extension of an image of the pointer on the second image plane passes through the further image of the target region, whereby the pointer points directly through the selected point toward the target region.

A method for positioning a guide for a biopsy needle for its proper insertion into the body of a patient from a selected point on a surface of the body, so as to enter in a straight line passing through a designated target region within the body, in conjunction with an imaging system utilizing radiation from flirts and second source positions for deriving first and second radiographic images, includes the steps of: (a) selecting a first auxiliary plane at an angle $\Theta_1$; moving the guide within the first auxiliary plane to an angle $\phi_1$ so as to cause the guide image on the first image plane to be aligned in a straight line through the target region; (b) storing the angle $\phi_1$; (c) selecting a second, different, auxiliary plane at an angle $\Theta_1$; (d) moving the guide to an angle $\phi_2$ within the second auxiliary plane so as to cause the guide image on the second image plane to be aligned in a straight line through the target region; (e) storing values for the angles $\Theta_2$ and $\phi_2$; (f) calculating, by utilizing values stored for the angles, rotations $\alpha$ and $\Theta$ so as to derive a first viewing plane $\pi$; and (g) moving the guide within the first viewing plane $\pi$ to an angle $\phi_3$ so as to cause the guide image on the second image plane to be aligned in a straight line through the tangent region, whereby the guide is properly aligned.

$\alpha$ and $\Theta$ are defined by $$[\theta = \arcsin(\|L_1 \wedge l_2\|)] \text{ and}$$

$$[\theta = \arcsin(\|L_1 \wedge l_2\|)] \text{ and}$$

$$\alpha = \arccos\left(\frac{L_1[3]L_2[1] - L_1[1]L_2[3]}{\sqrt{(L_1[3]L_2[1] - L_1[1]L_2[3])^2 + (L_1[3]L_2[2] - L_1[2]L_2[3])^2}}\right)$$

where $\Lambda$ is the vector product defined in $R^3$, 3-dimensional space.

Apparatus for positioning or aligning a biopsy needle for proper insertion into the body of a patient from a selected point on a surface of the body, so as to enter in a straight line passing through a designated target region within the body, in conjunction with an imaging system utilizing radiation from a first source position for deriving a first radiographic image on a first image plane of a portion of the body including a first image of the selected point and a first image of the target region, the first source position, the first image of the selected point, and the first image of the target region defining a first viewing plane $\pi$, the imaging system utilizing radiation from a second source position for deriving a second radiographic image on a second image plane of the portion of the body, including a second image of the selected point and a second image of the target region, the second source position, the second image of the selected point, and the second image of the target region define a second viewing plane $\pi^1$, comprises: measuring circle apparatus having a first position for establishing a first auxiliary plane at a first plane angle $\Theta_1$ with respect to a selected set of coordinates and for constraining a pointer for moving rotatably about the selected point and within the first auxiliary plane to a first angle of inclination $\phi_1$ relative to the set of coordinates such that a projection or extension of an image of the pointer on the first image plane passes through the first image of the target region; the measuring circle apparatus having a second position for establishing a second auxiliary plane at a second plane angle $\Theta_2$ with respect to the selected set of coordinates, the second plane angle being different from the first plane angle such that the first and second auxiliary planes form an intersection line and for constraining a pointer for moving rotatably about the selected point and within the second auxiliary plane to a second angle of inclination $\phi_2$ relative to the set of coordinates such that a projection or extension bf an image of the pointer on the first image plane passes through the first image of the target region, whereby the first viewing plane $\pi$ is uniquely defined by the angles $\Theta_1, \Theta_2, \phi_1$ and $\phi_2$ relative to the set of coordinates; apparatus for setting the pointer for moving rotatably about the selected point and within the first viewing plane $\pi$, now uniquely defined, to a third angle of inclination $\phi_3$ relative to the set of coordinates such that a projection or extension of an image of the pointer on the second image plane passes through the further image or the target region, whereby the pointer points directly through the selected point toward the target region.

An apparatus for positioning or aligning a biopsy needle for proper insertion into the body of a patient at a selected point on a surface of the body, so as to enter in a straight line passing through a designated target region within the body, the apparatus comprises a base including a first planar measuring portion having a center point; a second planar measuring portion mounted onto the base portion such that a center point of the second measuring portion is concentric with the center point of the first planar measuring portion so that the second planar measuring portion is rotatable about the center point, the second planar measuring portion being further rotatable about a straight line through its center; and a straight pointing device having one point pivotably affixed to the center point and being constrained for movement within a plane defined by the planar semicircular portion.

What is claimed is:

1. A method for visual servoing of a linear apparatus for aiming at a fixed target, said linear apparatus being rotatable in a defined plane about a fixed point, and wherein said linear apparatus and target are viewed by an imaging process in a two-dimensional (2D) image plane, said method comprising the steps of:

beginning at an arbitrary first line direction in space of said linear apparatus, detecting and storing an image of said first line direction in said 2D image plane;

detecting and storing an image of said fixed target in said 2D image plane;

rotating said linear apparatus through a first angle in said defined plane about said fixed point to a second line direction;

detecting and storing an image of said second line direction in said 2D image plane;

rotating said linear apparatus through a second angle in said defined plane about said fixed point to a third line direction;

detecting and storing an image of said third line direction in said 2D image plane;

determining and storing the point of intersection in said 2D image plane of said images of said first, second, and third line directions;

storing an image of a virtual straight line in said 2D image plane passing through said image of said fixed target in said 2D image plane and said point of intersection, said image of a virtual straight line being associated with a corresponding virtual line passing through said fixed point and said target;

determining the cross-ratio of said 2D images of said first, second, third, and virtual line directions;

calculating from said cross-ratio an aiming angle between said third and said virtual line directions in 3D space; and aligning said linear apparatus along said virtual line in accordance with said aiming angle so as to visually aim at said target.

2. A method for visual servoing of a linear apparatus as recited in claim 1, including a step of setting said cross-ratio of said 2D images of said first, second, third, and virtual line directions as equal to the cross-ratio of 3D first, second, third, and virtual line directions.

3. A method for visual servoing of a linear apparatus as recited in claim 2, wherein said step of determining the cross-ratio of said images of said first, second, third, and virtual line directions comprises the step of:

adding an arbitrary virtual line d that intersects said images of said first, second, third, and virtual line directions, hereinafter referred to as $l_1, l_2, l_3$ and $l_t$;

determining the cross-ratio $$c=(l_1,l_2,l_3,l_t)=(q_1,q_2,q_3,q_t)=(q_1q_3{}^*q_2q_t) \div (q_1q_t{}^*q_2q_3), \text{ where}$$

$q_1=l_1 \cap d$, $q_2=l_2 \cap d$, $q_3=l_3 \cap d$ and $q_t=l_t \cap d$ are the intersections of $l_1, l_2, l_3, l_t$ with d.

4. A method for visual servoing of a linear apparatus as recited in claim 3 wherein said first and second angles, and said aiming angle, are hereinafter referred to as $\theta_1$, $\theta_2$, and $\theta_t$, respectively, and c is the previously determined cross-ratio, and wherein said step of determining the cross-ratio of said 2D images of said first, second, third, and virtual line directions comprises the step of solving an equation for obtaining said aiming angle $\theta_t$:

$$(c-1)\sin\theta_2\cos\theta_t + \left(\frac{c\sin\theta_2}{\tan(\theta_1+\theta_2)} - \cos\theta_2\right)\sin\theta_t = 0.$$

5. A method for visual servoing of a linear apparatus in accordance with claim 1, wherein said steps are performed, at least in part, automatically under programmed computer control.

6. A method for visual servoing of a linear apparatus in accordance with claim 1, wherein said steps are performed, at least in part, automatically under programmed computer control in conjunction with X-ray imaging.

7. A method for visual servoing of a linear apparatus in accordance with claim 1, wherein said aiming angle is obtained by utilizing no more line directions of said linear apparatus than said first, second, and third line directions.

8. Apparatus for visual servoing of a linear apparatus for aiming at a fixed target, said linear apparatus being rotatable in a defined plane about a fixed point, and wherein said linear apparatus and target are viewed by an imaging process in a two-dimensional (2D) image plane, said apparatus for visual servoing including computerized apparatus for reading, storing and processing data, and wherein said computerized apparatus detects and stores an image of said fixed target in said 2D image plane; detects and stores an image in said 2D image plane of a first arbitrary line direction in space of said linear apparatus; detects and stores an image in said 2D image plane of a second line direction in space of said linear apparatus wherein said second direction line in space is at a first angle in said defined plane relative to said first line direction; detects and stores an image in said 2D image plane of a third line direction in space of said linear apparatus wherein said third direction line in space is at a second angle in said defined plane relative to said second line direction; determines and stores the point of intersection in said 2D image plane of said images of said first, second, and third line directions; stores an image of a virtual straight line in said 2D image plane passing through said image of said fixed target in said 2D image plane and said point of intersection, said image of a virtual straight line being associated with a corresponding virtual line passing through said fixed point and said target; determines the cross-ratio of said images of said first, second, third, and virtual line directions; and obtains from said cross-ratio an aiming angle between said third and said virtual line directions for alignment of said linear apparatus along said virtual line in accordance with said aiming angle.

9. Apparatus for visual servoing of a linear apparatus as recited in claim 8, wherein said computerized apparatus sets said cross-ratio of said images of said first, second, third, and virtual line directions as equal to the cross-ratio of said first, second, third, and virtual line directions.

10. Apparatus for visual servoing of a linear apparatus as recited in claim 9, wherein said computerized apparatus determines said cross-ratio of said images of said first, second, third, and virtual line directions by:

adding an arbitrary virtual line d that intersects said images of said first, second, third, and virtual line directions, hereinafter referred to as $l_1, l_2, l_3$ and $l_t$;

determining the cross-ratio $$c=(l_1,l_2,l_3,l_t)=(q_1,q_2,q_3,q_t)=(q_1q_3{}^*q_2q_t) \div (q_1q_t{}^*q_2q_3), \text{ where}$$

$q_1=l_1 \cap d$, $q_2=l_2 \cap d$, $q_3=l_3 \cap d$ and $q_t=l_t \cap d$ are the intersections of $l_1, l_2, l_3, l_t$ with d.

11. Apparatus for visual servoing of a linear apparatus as recited in claim 8, wherein said first and second angles, and said aiming angle, hereinafter referred to as $\theta_1, \theta_2$, and $\theta_t$, respectively, and wherein c is the previously determined cross-ratio, and wherein said computerized apparatus, in determining said cross-ratio said 2D images of said first, second, third, and virtual line directions solves an equation as follows for obtaining said aiming angle $\theta_t$:

$$(c-1)\sin\theta_2\cos\theta_t + \left(\frac{c\sin\theta_2}{\tan(\theta_1+\theta_2)} - \cos\theta_2\right)\sin\theta_t = 0.$$

12. Apparatus for visual servoing of a linear apparatus as recited in claim 8 wherein said computerized apparatus for reading, storing and processing data includes apparatus for rotating said linear apparatus through predetermined angles, including said first and second angles.

13. Apparatus for visual servoing of a linear apparatus as recited in claim 8 wherein said linear apparatus and target are viewed by an X-ray radiographic imaging process.

14. Apparatus for visual servoing of a linear apparatus in accordance with claim 8, wherein recited operations performed by said computerized apparatus are automatically performed, at least in part.

* * * * *